United States Patent
Sood et al.

(10) Patent No.: US 11,743,711 B2
(45) Date of Patent: Aug. 29, 2023

(54) ENFORCEMENT OF STEERING OF ROAMING FOR USER EQUIPMENT VIA A PROXY

(71) Applicant: T-MOBILE USA, INC., Bellevue, WA (US)

(72) Inventors: Romil Sood, Bellevue, WA (US); Boris Antsev, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 44 days.

(21) Appl. No.: 17/227,879

(22) Filed: Apr. 12, 2021

(65) Prior Publication Data

US 2022/0330004 A1    Oct. 13, 2022

(51) Int. Cl.
*H04W 4/00* (2018.01)
*H04W 8/06* (2009.01)
*H04W 8/08* (2009.01)
*H04L 67/56* (2022.01)

(52) U.S. Cl.
CPC .............. *H04W 8/06* (2013.01); *H04L 67/56* (2022.05); *H04W 8/08* (2013.01)

(58) Field of Classification Search
CPC .... H04L 67/50; H04L 67/56; H04M 15/8038; H04W 8/02; H04W 8/06; H04W 8/08; H04W 36/0011; H04W 36/0022; H04W 36/0055; H04W 36/0066
See application file for complete search history.

(56) References Cited

U.S. PATENT DOCUMENTS

| | | | |
|---|---|---|---|
| 10,736,040 B1* | 8/2020 | Chen | H04W 72/042 |
| 2005/0282538 A1* | 12/2005 | Balon | H04W 24/02 455/433 |
| 2009/0094351 A1* | 4/2009 | Gupta | H04W 48/08 726/3 |
| 2020/0344604 A1* | 10/2020 | He | H04W 12/088 |
| 2021/0021994 A1* | 1/2021 | Kolekar | H04W 12/037 |

* cited by examiner

*Primary Examiner* — Matthew W Genack
(74) *Attorney, Agent, or Firm* — Marshall, Gerstein & Borun LLP

(57) ABSTRACT

Methods, systems, and non-transitory computer readable media for enforcing a steering of roaming (SoR) decision. More particularly, enforcing the SoR decision includes receiving, at a proxy and from a user equipment (UE) located in a visitor network, a registration message to register with a home network, the registration message including an identifier of the visitor network. The proxy routes the registration message to a steering controller to determine a SoR policy decision. The proxy then enforces the SoR policy decision of the steering controller.

18 Claims, 5 Drawing Sheets

ENFORCEMENT OF STEERING OF ROAMING FOR USER EQUIPMENT VIA A PROXY

FIELD OF THE DISCLOSURE

This application generally relates to steering of roaming devices, and in particular, enforcing compliance with a steering of roaming decision.

BACKGROUND

Network operators provide network services to user equipment (UEs) located within their network footprint (i.e., their "home network"). To expand network coverage, network operators often partner with other network operators associated with respective network footprints (i.e., "visitor networks"). Accordingly, the network operator's customers have network connectivity when their UE is located in a visitor network (i.e., the UE is "roaming"). To select the networks on which the UE is configured to connect, the UE maintains a configurable roaming list that identifies the relative priority for various visitor network. When the UE is located outside of the home network, the UE analyzes the roaming list and attempts to connect to a visitor network in accordance with the priority set forth in the roaming list.

When a UE attempts to register with a network, traditional networks are configured to provide the roaming list. Because visitor networks collect fees when a home network UE is connected to the visitor network, visitor networks may try to block or ignore attempts by the home network to steer the UE onto another visitor network. Inadequate steering can result in inferior network selection for users and network congestion. Accordingly, there is a need to enforce a steering of roaming (SoR) decision made by a home network to prevent visitor networks from interfering with the execution of the SoR decision.

SUMMARY

In one embodiment, a computer-implemented method is provided. The method includes (1) receiving, from a visitor network and at a security edge protection proxy (SEPP), a registration message to register with a home network, the registration message including an identifier of the visitor network; (2) forwarding, by one or more processors of the SEPP and to a steering controller, the registration message; (3) responsive to forwarding the registration message, receiving, from the steering controller, a steering decision; and (4) enforcing, by one or more processors of the SEPP, the received steering decision.

In another embodiment, a computer-implemented method is provided. The method includes (1) receiving, from a visitor network and at a security edge protection proxy (SEPP), a registration message to register with a home network, the registration message including an identifier of the visitor network; (2) forwarding, by one or more processors of the SEPP and to a steering controller, the registration message; (3) forwarding, by one or more processors of the SEPP and to a unified data management function (UDM) of the home network, the registration message; (4) responsive to forwarding the registration message, receiving, from the UDM, a registration decision; and (5) enforcing, by one or more processors of the SEPP, the received registration decision.

In yet another embodiment, a non-transitory storage medium storing computer-executable instructions is provided. The instructions, when executed by one or more processors, cause the one or more processors to (1) receive, from a visitor network and at the proxy, a registration message to register with a home network, the registration message including an identifier of the visitor network; (2) forward, to a steering controller, the registration message; (3) responsive to forwarding the registration message, receive, from the steering controller, a steering decision; and (4) enforce the received steering decision.

DETAILED DESCRIPTION

Figure 1A:
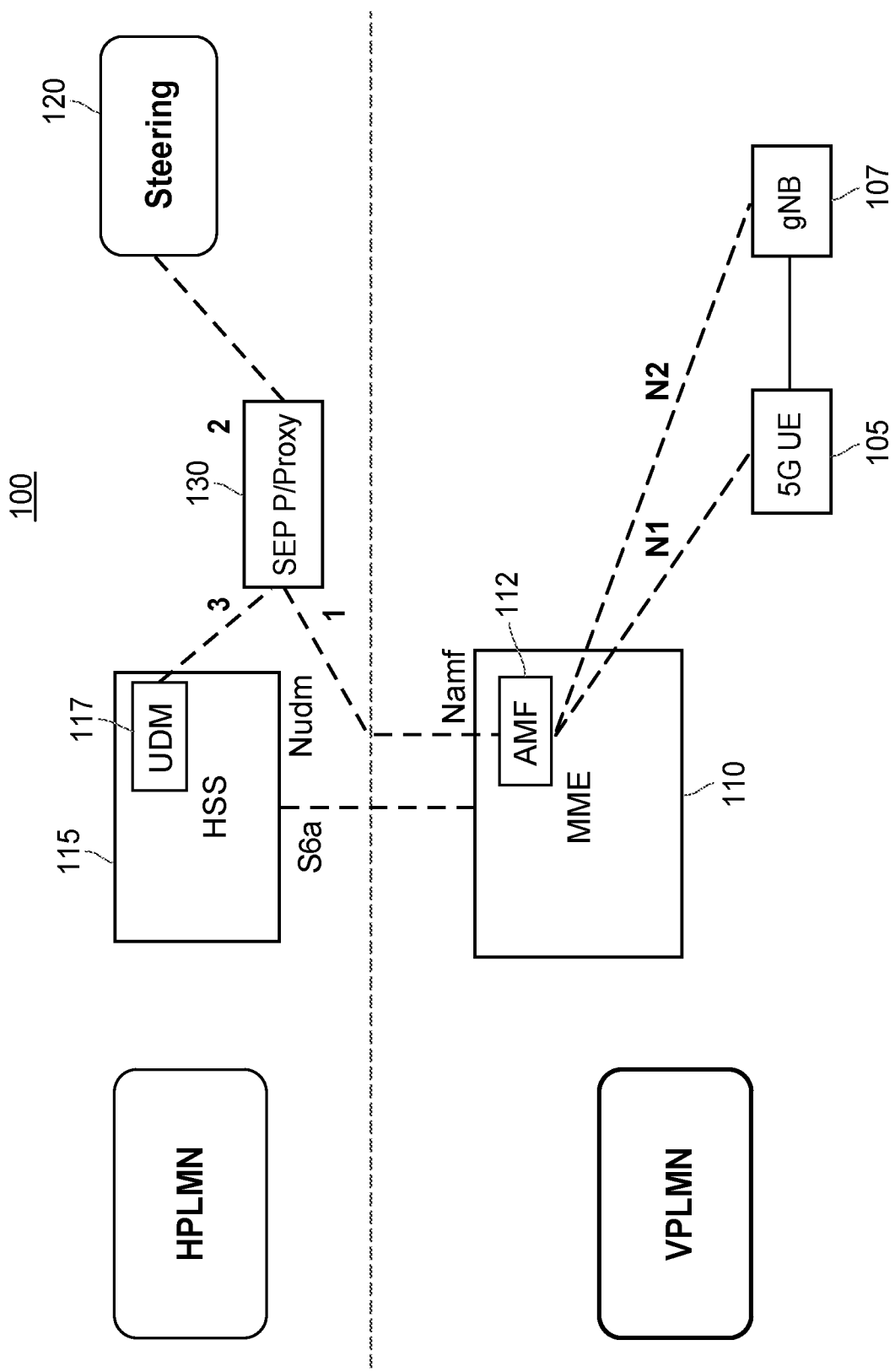
FIGS. 1A and 1B depicts example environments in which the enforcement of steering of roaming techniques described herein are implemented.

FIG. 1A depicts an example environment 100 in which the enforcement of steering of roaming (SoR) techniques described herein are implemented. As illustrated, the environment 100 includes a home public land mobile network (HPLMN) and a visitor public land mobile networks (VPLMN). While FIG. 1A depicts only a single VPLMN, the HPLMN may be connected to any number of additional VPLMNs in the depicted manner. The HPLMN includes a home subscriber subsystem (HSS) 115 that stores information associated with authentication, authorization, and/or accounting for the various subscribers and their respective UEs (e.g., mobile phones, tablets, smart watches, laptops, mobile access points, internet of things (IoT) devices, and/or any other computing device that includes communication components capable of connecting to the HPLMN). The HSS 115 includes a unified data manager (UDM) 117 that is configured to enforce network operator policy decisions. For example, the UDM 117 may associate a subscriber and/or UE with a particular service plan.

The VPLMN includes a mobility management entity (MME) 110 that may be configured to track a location for each UE connected to the VPLMN and manage inbound and outbound roaming connections between the VPLMN and other networks (such as the HPLMN). As illustrated, the MME 110 includes an access management function (AMF) 112 that controls communications related to connections and mobility. In a conventional configuration, the AMF 112 of the VPLMN is communicatively coupled directly to the UDM 117 of the HPLMN via a Nudm interface that is interoperable with a Namf interface of the AMF 112.

Instead, the environment 100 includes a security edge protection proxy (SEPP) 130 interfaces between the AMF of the 112 of the VPLMN and the UDM 117 of the HPLMN. Accordingly, in the environment 100, the Namf interference of the AMF 112 is connected to the SEPP 130 instead of directly to the UDM 117. In alternate embodiments, the VPLMN may include their own SEPP. Accordingly, in these embodiments, the VPLMN may be configured to connect the Namf interface to the SEPP of the VPLMN and the SEPP 130 and the SEPP of the VPLMN are connected via an N32 interface.

As the name implies, SEPP 130 acts as an edge enforcement entity to ensure only authorized communications enter the HPLMN. To this end, the SEPP 130 acts as a secure centralized connection point between the HPLMN and any number of VPLMNs. If the SEPP 130 determines that access to the HPLMN is proper, the SEPP 130 routes the corresponding data to the UDM 117 via the Nudm interface. It should be appreciated that while the techniques disclosed herein generate refer to the SEPP 130, in alternate embodiments, another proxy entity may be configured to perform the functionality of the SEPP 130 described herein. For example, the illustrated embodiment, the conventional S6a interface between the MME 112 and the HSS 115 is not re-routed to the SEPP 130, although in other embodiments. In this example, the alternate proxy may also be configured to act as a proxy as part of the S6a interface.

As illustrated, a UE 105 is connected to the VPLMN. More particularly, a user plane of the UE 105 is connected to a next generation node B (gNB) 107 of the VPLMN and the control plane of the UE 105 is connected to the AMF 112 via an N1 interface. When the UE 105 attempts to register with the VPLMN, the UE 105 sends a registration message over the control plane to the AMF 112. The AMF 112 then routes the registration message to the SEPP 130 via which access to the HPLMN is controlled. To this end, the SEPP 130 routes the registration request to the steering controller 120, which makes a SoR decision about which network the UE 105. The connection between the SEPP 130 and the steering controller 120 may be implemented via an HTTP interface, an IP interface (including Ethernet), a RESTful API interface, a diameter routing agent (DRA) interface, a Ro interface, and/or another appropriate interface between components of a mobile network.

In the environment 100, the steering controller 120 does not include a direct connection with the UDM 117. Instead, the steering controller 120 sends an indication the SoR policy decision back to the SEPP 130. In some embodiments, to decrease the time for processing a device registration, when the SEPP 130 sends the registration message to the steering controller 130, the SEPP 130 may also forward the registration message to the UDM 117 to begin the process of registering the UE 105 with the HPLMN in parallel to the determination of the SoR policy decision.

The SEPP 130 may then enforce the SoR decision from the steering controller. For example, the SoR policy decision may be a preferred roaming list (PRL) or other listing associated with permitting home network UEs to utilize one or more VPLMNs. Accordingly, the SEPP 130 may compare an identifier associated with the VPLMN to the SoR policy decision to determine whether the registration request corresponding to the UE 105 complies with the SoR policy decision. If the registration message complies with the SoR policy decision, the SEPP 130 routes the registration message on to the UDM 117 for completing the registration process. As part of completing the registration process, the UDM 117 may transmit a message to inform the UE 105 that the registration was successful back to the SEPP 130 for routing to the UE 105 via the AMF 112.

On the other hand, if the registration corresponding to the UE 105 is not in compliance with the SoR policy decision, the SEPP 130 may block the UE 105 the registration attempt corresponding to the UE 105. In some embodiments, the SEPP 130 blocks the registration attempt by sending a registration failure message back to the UE 105 via the AMF 112. Additionally, if the SEPP 130 had sent the registration message to the UDM 117 to begin the process of registering the UE 105 with the HPLMN, the SEPP 130 may also notify the UDM 117 that the UE 105 is associated with a registration attempt that is not in accordance with the SoR policy decision. In response, the UDM 117 may then stop any registration processes corresponding to the registration of the UE 105.

Figure 1B:
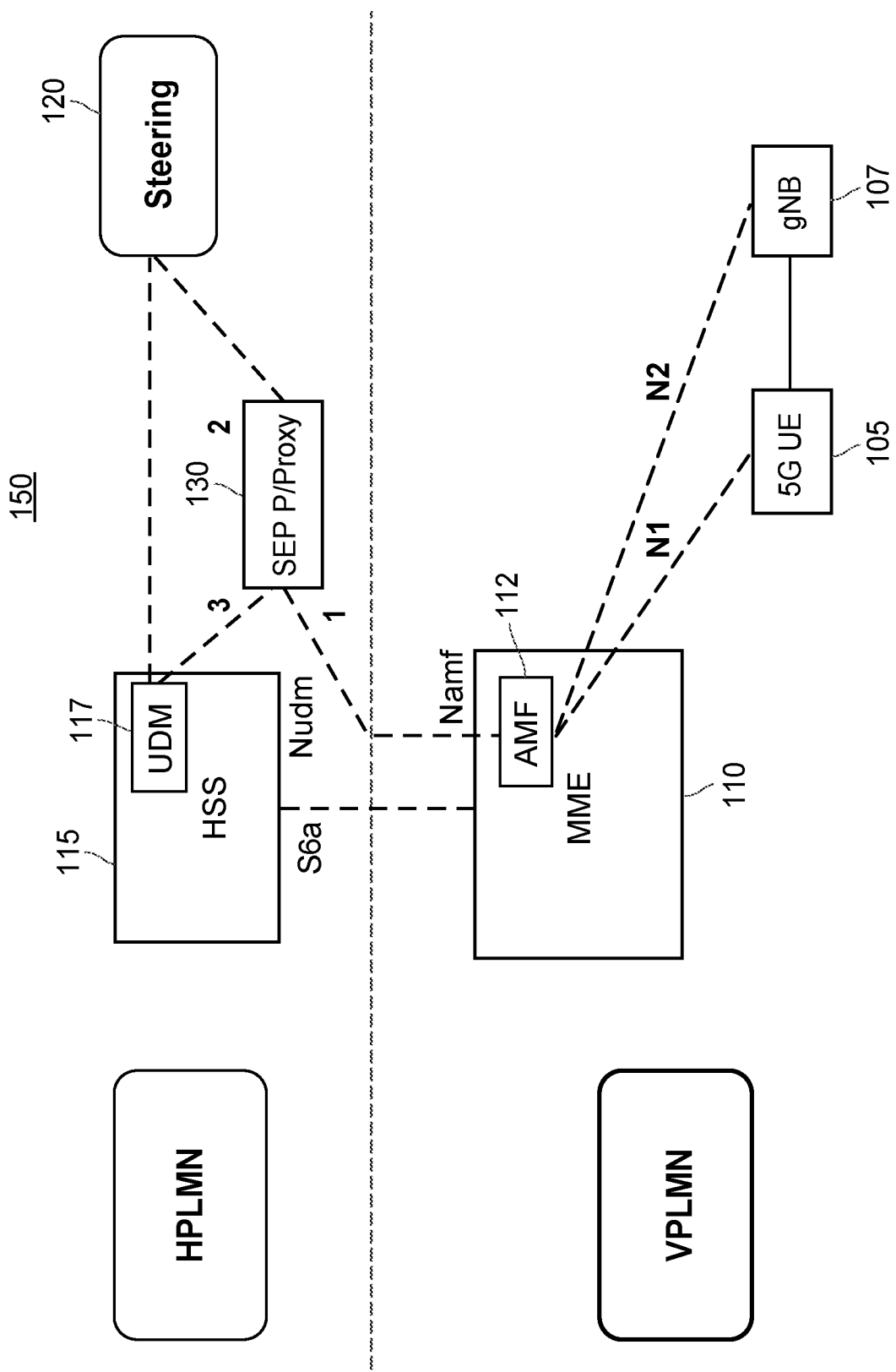

FIG. 1B depicts an alternate example environment 150 in which, unlike the environment 100, there is a direct communication path between the steering controller 120 and the UDM 117. Similar to the communication link between the SEPP 130 and the steering controller 120, the communication link between the UDM 117 and the steering controller 120 may be implemented via an HTTP interface, an IP interface (including Ethernet), a RESTful API interface, a diameter routing agent (DRA) interface, a Ro interface, and/or another appropriate interface between components of a mobile network). Accordingly, in the environment 150, the steering controller 120 may communicate the SoR policy decision directly to the UDM 117 via this interface. In response, the UDM 117 may determine whether or not registration corresponding to the UE 105 is in compliance with the SoR policy decision. If the registration is in compliance with the SoR policy decision, the UDM 117 may complete the registration and send a registration success message to the SEPP 130 for routing to the UE 105 via the AMF 112. On the other hand, if the registration is not in compliance with the SoR policy decision, the UDM 117 may block the registration and send a registration failure message to the SEPP 130 for routing to the UE 105.

It should be appreciated that the UE 105 is typically provisioned with a PRL (though not necessarily the one determined by the steering controller 120). If the registration attempt by the UE via the VPLMN is blocked by the SEPP 130, the UE 105 will then send another registration message via a next available VPLMN included in the PRL. Accordingly, at some point after failing the initial registration via the VPLMN, the SEPP 130 may receive a second registration attempt corresponding to the UE from an AMF of another VPLMN. In this scenario, if the registration attempt received via the alternate VPLMN is in compliance with the SoR decision, the SEPP 130 and/or the UDM 117 may complete the registration for the UE 105 to utilize the other VPLMN.

In some scenarios, the registration attempt associated with the VPLMN includes a time to live (TTL) timer. Accordingly, for some registration attempts, the additional processing to determine compliance with the SoR policy decision of the steering controller 120 may cause the TTL timer to expire for the registration attempt corresponding to the VPLMN. This may occur more frequently in the environment 100 when there is no direct communication link between the UDM 117 and the steering controller 120. If the VPLMN is indeed the VPLMN that complies with the SoR policy decision of the steering controller 120, when the SEPP 130 receives the registration attempt from the UE 105 via the other VPLMN, the SEPP 130 may respond with a message that fails the registration message via the other VPLMN and causes the UE 105 to retry registration via the VPLMN. In some embodiments, the SEPP 130 and/or the steering controller 120 may include a cache of recent SoR policy decisions. Thus, when the SEPP 130 receives the second registration attempt via the VPLMN, the SEPP 130 and/or the steering controller 120 may query the cache to quickly obtain the SoR policy decision such that the TTL timer of the second registration attempt does not expire.

In embodiments described herein, the SoR policy decision not only includes the decision of whether to allow the UE 105 onto the HPLMN and/or the VPLMN, but also which radio access technologies (RATs) are associated with this access. For example, in some embodiments, the steering controller 120 may generate a SoR policy decision that permits roaming over LTE via the VPLMN, but not 5G. In this scenario, the SEPP 130 may fail the registration with the 5G network components of the HPLMN, but permit registration with the LTE network components of the HPLMN.

Additionally, the HPLMN may be adapted to integrate the SEPP 130 with LTE equipment and/or GSM equipment. To this end, if the HPLMN may include other edge routers or proxies via which the LTE and/or GSM network is accessed. Accordingly, in these embodiments, the edge routers or proxies are configured to route any registration attempts to the SEPP 130 for enforcement of SoR policy decisions.

It should be appreciated that while the environments 100 and 150 depict components commonly associated with a 5G network, alternative embodiments may be implemented in other network architecture, such as a long term evolution (LTE) network. For example, an LTE or 5G network may include an IP multimedia subsystem (IMS) configured to support one or more multimedia services (e.g., Voice over LTE (VoLTE) or voice or new radio (VoNR)). In these embodiments, the IMS may interact with the SEPP 130 to determine a policy decision associated with the one or more multimedia services and the roaming list over one or more LTE or 5G control plane interfaces.

Figure 2A:
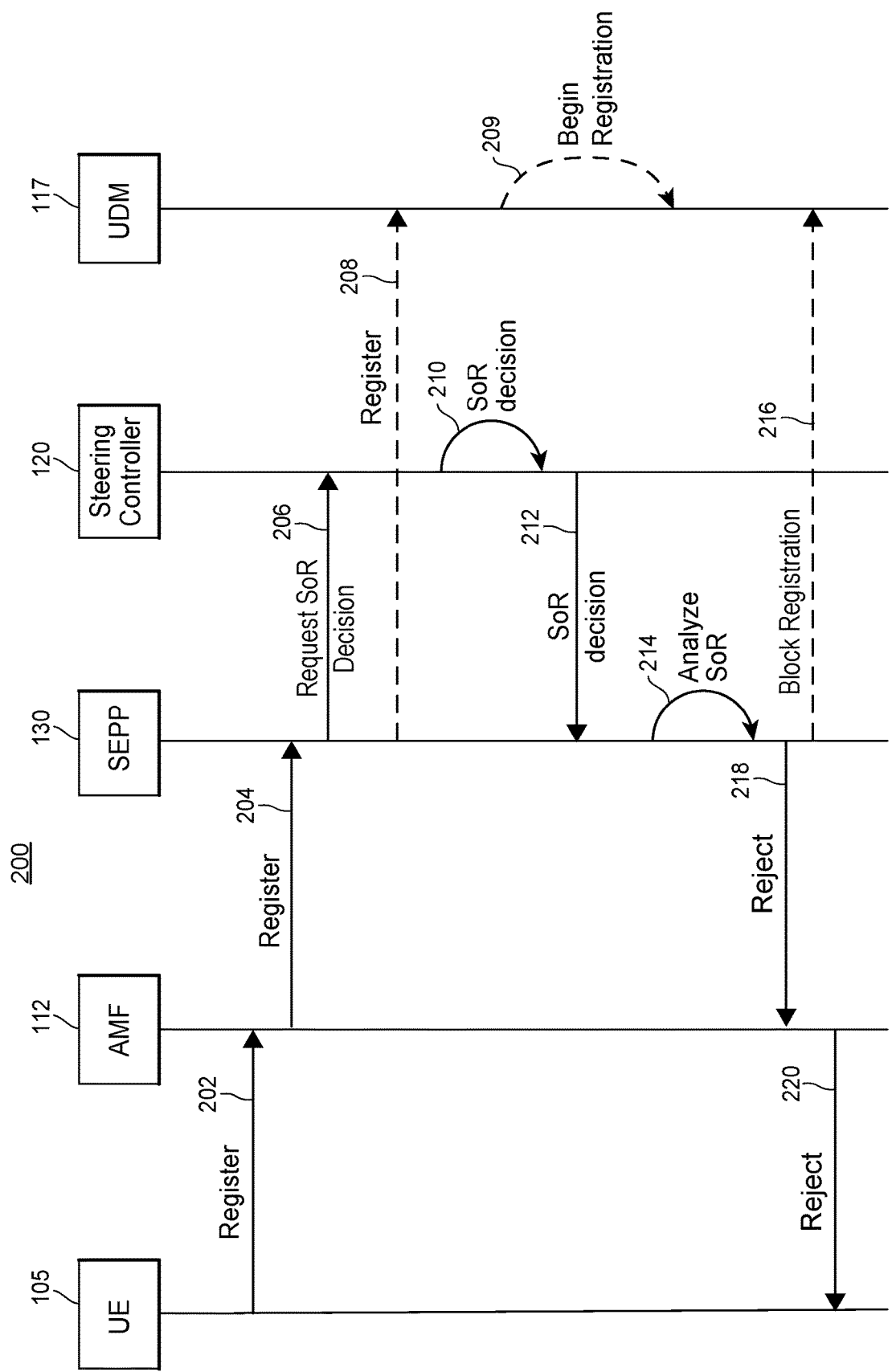
FIGS. 2A and 2B depict example signal diagrams in which a proxy enforces a steering of roaming decision in accordance with techniques described herein.

FIG. 2A illustrates an example signal diagram 200 via which a registration attempt is blocked to enforce a SoR decision. More particularly, the signal diagram 200 illustrates the signals exchanged between the network components included in the environment 100, including the UE 105, the AMF 112 of the VPLMN MME 110, the SEPP 130, the steering controller 120 and the UDM 117 of the HPLMN HHS 115.

As illustrated, the signal diagram 200 begins when the UE 105 transmits a registration message (202) to the AMF 112. The UE may send the registration message over a wireless network interface between the UE 105 and the AMF 112, such as a 5G or LTE network interface. In some embodiments, the registration message is sent to the gNB 107 for routing to the AMF 112. The registration message may include an identifier of the UE 105, such as a MEID, an ICCID, a MAC address, or other unique identifier associated with the UE 105. The AMF 112 then forwards the registration message (204) to the SEPP 130. The AMF 112 may append an identifier of the VPLMN, such as a MCC and MNC, and/or an indication of a geographic location of the UE 105 to the registration message to indicate the VPLMN on which the UE is attempting to roam. The geographic location may be determined based upon an identifier of the gNB 107 or the MME 110.

In response, the SEPP 130 transmits a request (206) for a SoR policy decision to the steering controller 120. The SEPP 130 may include the identifier of the UE 105 and the identifier of the VPLMN in the request. Additionally, in some embodiments, the SEPP 130 forwards the registration message (208) to the UDM 117 such that the UDM 117 is begins processing the registration (209) in parallel to the steering controller 120 determining (210) a SoR policy decision.

More particularly, the steering controller 120 may determine a SoR policy specific to the UE 105 and/or the geographic area in which the UE 105 is roaming (as identified based upon the identifier of the VPLMN). For example, the SoR policy decision may be a PRL that indicates the preferred roaming partners in the geographic area in which the UE 105 is roaming. In some scenarios, the PRL includes a separate list for each RAT supported by the HPLMN and/or the UE 105. In some scenarios, the roaming list customized for the UE 105 based upon a subscriber type (e.g., a service plan and/or UE capabilities) associated with the UE 105, network traffic conditions, a location of the UE, and/or any on-demand network needs (e.g., a temporary surge in network subscribers due to an event such as a sports match or a concert). In other scenarios, the roaming list is standardized for any UE attempting to roam in the geographic location. As another example, the SoR policy decision may be a decision to permit or block the UE 105 from roaming over the VPLMN. In this example, the steering controller 120 may be configured to make the decision to block or permit the registration based upon a roaming list maintained thereat.

After determining the SoR policy decision, the steering controller 120 sends the SoR policy decision (212) to the SEPP 130 for enforcement thereof. In particular, the SEPP 130 may analyze the SoR policy decision (214) to determine whether the registration message complies therewith. For example, if the SoR policy decision is a roaming list, the SEPP 130 may determine whether the VPLMN corresponds to the highest ranked VPLMN in the roaming list to determine whether the registration message is in compliance with the SoR policy decision.

Because the signal diagram 200 illustrates the signal path for blocking a registration attempt, it will be assumed that the VPLMN is not the highest ranked VPLMN in the roaming list and/or the steering controller 120 returned a policy decision to block the registration. In some embodiments where the SEPP 130 forwarded the registration message to the UDM 117, the SEPP 130 may send a message (216) that causes the UDM 117 to block the registration in progress associated with the UE 105. In other embodiments where the SEPP 130 forwarded the registration message to the UDM 117, the SEPP 130 does not send a message to the UDM 117 causes a TTL timer corresponding the registration message to expire, thereby blocking the registration with the HPLMN. As illustrated, The SEPP 130 also sends a registration rejection message (218) to the AMF 112, which then routes the registration rejection message (220) back to the UE 105. In some embodiments, the AMF 112 route the registration rejection message to the gNB 107 for routing to the UE 105.

In an alternate scenario when the registration is permitted, if the SEPP 130 previously forwarded the registration message to the UDM 117, the SEPP 130 may send a confirmation message to the UDM 117 that indicates that the registration message is in compliance with the SoR policy decision. If the SEPP 130 has not previously forwarded the registration message to the UDM 117, the SEPP 130 may forward the registration message onto the UDM 117 after confirming compliance with the SoR policy decision. After the UDM 117 completes the registration of the UE for roaming over the VPLMN, the UDM 117 sends a registration success message to the SEPP 130, which then routes the registration success message to the AMF 112 for routing to the UE 105.

Figure 2B:
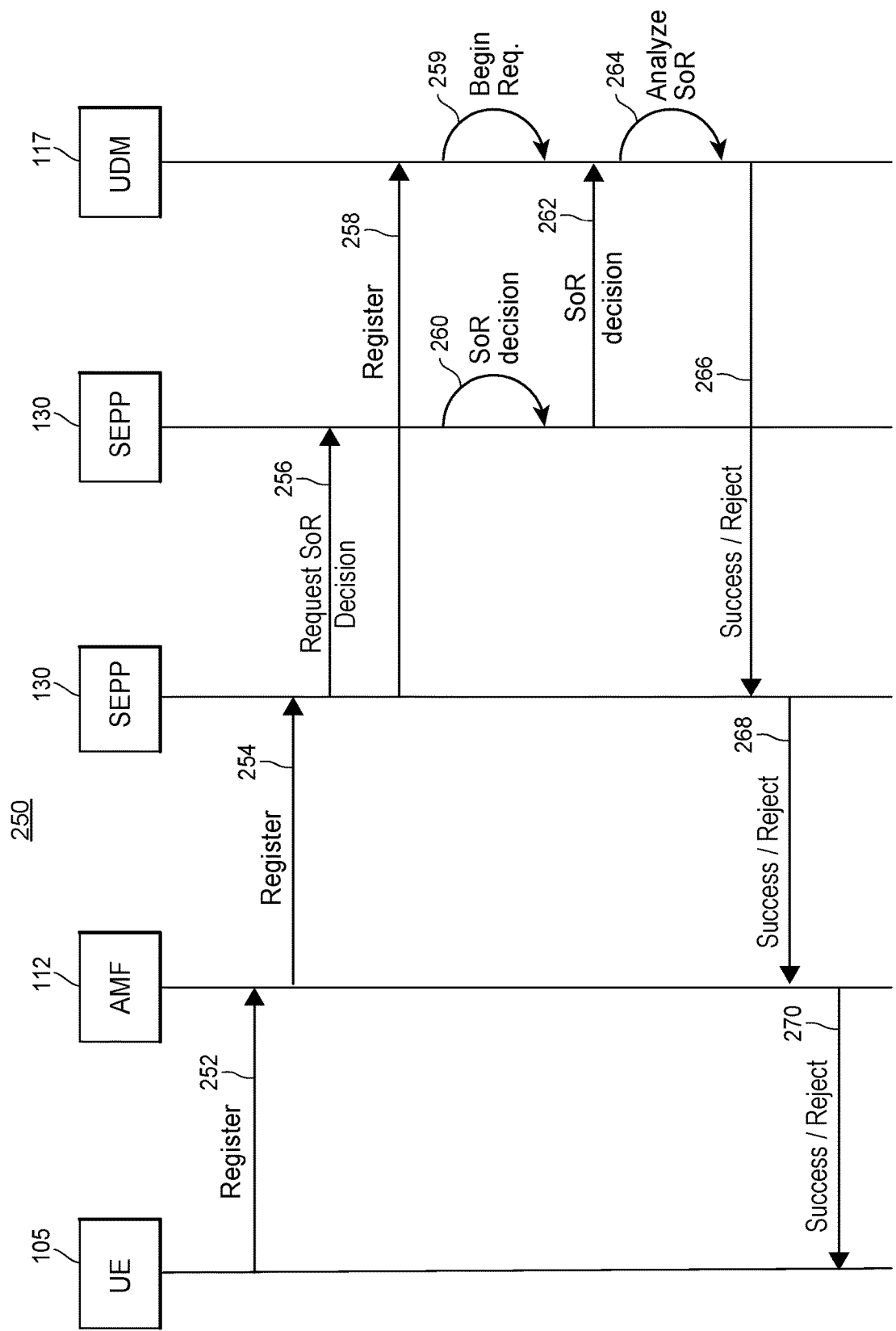

FIG. 2B illustrates an example signal diagram 250 via which a registration attempt is enforcing a SoR decision. More particularly, the signal diagram 250 illustrates the signals exchanged between the network components included in the environment 150, including the UE 105, the AMF 112 of the VPLMN MME 110, the SEPP 130, the steering controller 120 and the UDM 117 of the HPLMN HHS 115. As described above, unlike the environment 100, the environment 150 includes an interface between the steering controller 120 and the UDM 117.

As illustrated, the signal diagram 250 begins when the UE 105 transmits a registration message (252) to the AMF 112. The AMF 112 then forwards the registration message (254) to the SEPP 130. In response, the SEPP 130 transmits a request (256) for a SoR policy decision to the steering controller 120. The SEPP 130 forwards the registration message (208) to the UDM 117 such that the UDM 117 begins processing the registration (259) in parallel to the steering controller 120 determining (210) a SoR policy decision. It should be appreciated that the steps 252-260 may occur in a similar manner described with respect to steps 202-210 of the signal diagram 200, respectively.

Because the steering controller 120 is communicatively coupled to the UDM 117, the steering controller 120 is now configured to transmit the SoR policy decision (262) directly to the UDM 117. The UDM 117 then determines (264) whether the registration message complies with the SoR policy decision. It should be appreciated that the UDM 117 may perform a similar analysis to the one performed by the SEPP 130 at step 214 of the signal diagram 200. Based on whether the registration message is in compliance with the SoR policy decision, the UDM 117 will send the SEPP 130 either a registration success message or a registration rejection message (266). The SEPP 130 then forwards the registration success message or a registration rejection message (268) to the AMF 112, which then routes the registration success message or a registration rejection message (270) to the UE 105.

Figure 3:
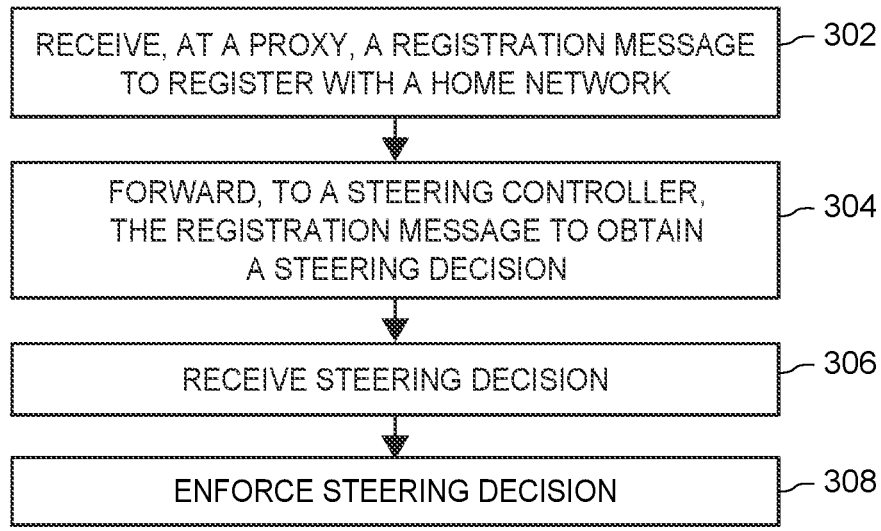
FIG. 3 depicts an example method in which a proxy (such as the SEPP 130 of FIG. 1A or 1B) is configured to enforce a steering of roaming decision in response to a registration message received from a UE located in a visitor network.

Turning now to FIG. 3, an example method 300 is illustrated in which a proxy (such as the SEPP 130 of FIGS. 1-2) is configured to enforce a SoR policy decision associated with a registration message received from a UE (such as the UE 105 of FIGS. 1-2). More particularly, the method 300 may be performed by one or more processors of the proxy.

The method 300 begins at block 302 when the proxy receives, from a visitor network (such as the VPLMN of FIG. 1), a registration message to register with a home network (such as the HPLMN of FIG. 1). More particularly, the proxy may receive the registration message from an AMF (such as the AMF 112 of FIGS. 1-2) of the visitor network. As described herein, the registration message may include an identifier of the visitor network and/or an identifier of the UE.

At block 304, the proxy forwards the registration message to a steering controller (such as the steering controller 120 of FIGS. 1-2). In some embodiments, to increase the speed at which the registration is processed, the proxy may also forward the registration message to a UDM (such as the UDM 117 of FIGS. 1-2) of the home network contemporaneous to forwarding the registration message to the steering controller.

At block 306, responsive to forwarding the registration message to the steering controller, the proxy receives, from the steering controller, a steering decision (such as the SoR policy decision described with respect to FIGS. 1-2). It should be appreciated that the steering controller may generate the steering decision based upon the identifier of the visitor network and/or the UE that is included with the received registration message. As described herein, the steering decision may be a PRL or an indication of an acceptance parameter indicative of whether or not to accept a registration corresponding to the registration message. Additionally, the steering decision may include a steering decision for two or more RATs supported by the home network. For example, the steering decision may include a steering decision associated with a 5G registration, an LTE registration, and/or a 3G registration.

At block 308, the proxy enforces the received steering decision. For example, the proxy may send, to the visitor network, an indication of the received steering decision. More particularly, the proxy may send the indication to the AMF of the visitor network, which then routes the indication to the UE. Additionally, the proxy may send, to the UDM of the home network, an indication of the received steering decision. As described herein, the indication may cause the UDM to accept or block the registration, or to begin registering the UE with the home network.

In scenarios where the proxy rejects the registration corresponding to the registration message and/or causes a TTL timer associated with the registration to expire, the UE may attempt to roam using a different visitor network than the one via which the prior registration message was received. According, in this scenario, the proxy may be configured to receive, from the other visitor network, a new registration message corresponding to the UE. The proxy may then repeat the steps described with respect to blocks 302-308 with respect to the new registration message.

Figure 4:
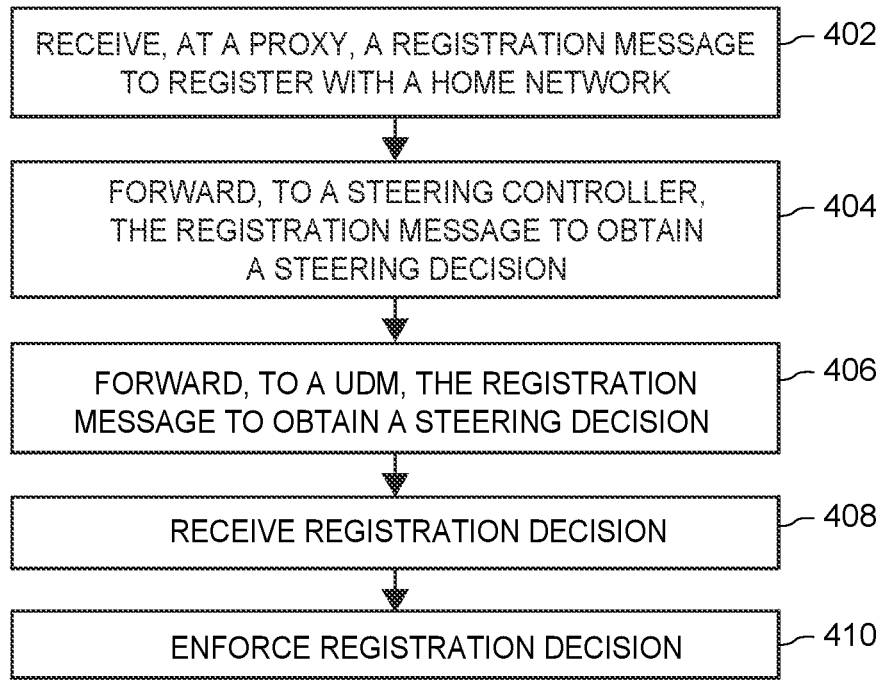
FIG. 4 depicts an example method in which a proxy (such as the SEPP 130 of FIG. 1B) is configured to enforce a steering of roaming decision in response to a registration message received from a UE located in a visitor network.

Turning now to FIG. 4, an example method 400 is illustrated in which a proxy (such as the SEPP 130 of FIGS. 1B and 2B) is configured to enforce a SoR policy decision associated with a registration message received from a UE (such as the UE 105 of FIGS. 1B and 2B). More particularly, the method 400 may be performed by one or more processors of the proxy.

The method 400 begins at block 402 when the proxy receives, from a visitor network (such as the VPLMN of FIG. 1), a registration message to register with a home network (such as the HPLMN of FIG. 1). At block 404, the proxy forwards the registration message to a steering controller (such as the steering controller 120 of FIGS. 1B and 2B). At blocks 402-404, the proxy may perform similar actions described with respect to blocks 302-304 of the method 300.

At block 406, the proxy forwards, to a UDM (such as the UDM 117 of FIGS. 1B and 2B) of the home network, the registration message. As described with respect to the signal diagram 250, the UDM will receive a steering decision from the steering controller to determine whether or not to permit or rejection the registration corresponding to the registration message.

In response, at block 408, the proxy receives, from the UDM, a registration decision. As described herein, the registration decision may be an acceptance parameter indicative of whether or not to accept a registration corresponding to the registration message. To this end, the registration decision may be a message formatted in compliance with a communication protocol for a registration being rejected or successfully completed.

At block 410, the proxy enforces the received registration decision. For example, the proxy may send, to the visitor network, an indication of the received registration decision. More particularly, the proxy may route the registration decision received from the UDM to the AMF of the visitor network, which then routes the registration decision to the UE.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. For example, in 5G networks, various components (including the proxies and/or SEPPs described herein) may be virtual components distributed across a plurality of servers interconnected to one another and implemented, for example, using a network functions virtualization (NFV) framework. Accordingly, any reference to a 5G network component envisions the logical arrangement of the 5G network component acting as a single function block that is implemented by a plurality of computing devices distributed across a plurality of physical locations of the corresponding network.

Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method comprising:
   receiving, from a visitor network and at a security edge protection proxy (SEPP), a registration message to register with a home network, the registration message including an identifier of the visitor network;
   forwarding, by one or more processors of the SEPP and to a steering controller, the registration message;
   responsive to forwarding the registration message, receiving, from the steering controller and at the SEPP, a steering decision, wherein the steering decision includes a preferred roaming list (PRL); and
   enforcing, by one or more processors of the SEPP, the received steering decision based on the PRL.

2. The computer-implemented method of claim 1, wherein enforcing the received steering decision comprises:
   sending, to the visitor network, an indication of the received steering decision.

3. The computer-implemented method of claim 1, wherein enforcing the received steering decision comprises:
   sending, to a unified data management function (UDM) of the home network, an indication based upon the received steering decision.

4. The computer-implemented method of claim 1, wherein forwarding the registration message further comprises:
   forwarding, by one or more processors of the SEPP and to the UDM of the home network, the registration message.

5. The computer-implemented method of claim 1, wherein the steering decision indicates an acceptance parameter indicative of whether or not to accept a registration corresponding to the registration message.

6. The computer-implemented method of claim 1, wherein the steering decision includes a steering decision for two or more radio access technologies (RATs) supported by the home network.

7. The computer-implemented method of claim 1, wherein enforcing the steering decision comprises:
   rejecting or timing out, by one or more processors of the SEPP, a registration for a user equipment (UE) corresponding to the registration message received from the visitor network; and
   receiving, by one or more processors of the SEPP and from another visitor network, a registration message corresponding to the UE.

8. A computer-implemented method comprising:
   receiving, from a visitor network and at a security edge protection proxy (SEPP), a registration message to register with a home network, the registration message including an identifier of the visitor network;
   forwarding, by one or more processors of the SEPP and to a steering controller, the registration message;
   forwarding, by one or more processors of the SEPP and to a unified data management function (UDM) of the home network, the registration message;
   responsive to forwarding the registration message, receiving, from the UDM and at the SEPP, a registration decision, wherein the registration decision includes a preferred roaming list (PRL); and
   enforcing, by one or more processors of the SEPP, the received registration decision based on the PRL.

9. The computer-implemented method of claim 8, wherein enforcing the received registration decision comprises:
   sending, to the visitor network, an indication of the received registration decision.

10. The computer-implemented method of claim 8, wherein the registration decision indicates an acceptance parameter indicative of whether or not to accept a registration corresponding to the registration message.

11. The computer-implemented method of claim 8, wherein the registration decision includes a registration decision for two or more radio access technologies (RATs) supported by the home network.

12. The computer-implemented method of claim 8, wherein enforcing the registration decision comprises:

rejecting or timing out, by one or more processors of the SEPP, a registration for a user equipment (UE) corresponding to the registration message received from the visitor network; and receiving, by one or more processors of the SEPP and from another visitor network, a registration message corresponding to the UE.

13. A non-transitory storage medium storing computer-executable instructions that, when executed by one or more processors of a proxy, cause the one or more processors to:

receive, from a visitor network and at the proxy, a registration message to register with a home network, the registration message including an identifier of the visitor network;

forward, to a steering controller, the registration message;

responsive to forwarding the registration message, receive, from the steering controller and at the proxy, a steering decision, wherein the steering decision includes a preferred roaming list (PRL); and enforce the received steering decision based on the PRL.

14. The non-transitory storage medium of claim 13, wherein to enforce the received steering decision, the instructions, when executed, cause the one or more processors to:

send, to the visitor network, an indication of the received steering decision.

15. The non-transitory storage medium of claim 13, wherein to enforce the received steering decision, the instructions, when executed, cause the one or more processors to:

send, to a unified data management function (UDM) of the home network, an indication based upon the received steering decision.

16. The non-transitory storage medium of claim 13, wherein to forward the registration message, the instructions, when executed, cause the one or more processors to:

forward, to the UDM of the home network, the registration message.

17. The non-transitory storage medium of claim 13, wherein the steering decision indicates an acceptance parameter indicative of whether or not to accept a registration corresponding to the registration message.

18. The non-transitory storage medium of claim 13, wherein the steering decision includes a steering decision for two or more radio access technologies (RATs) supported by the home network.

* * * * *